United States Patent [19]
Keeter et al.

[11] 3,919,894
[45] Nov. 18, 1975

[54] PRE-ENGAGEMENT TURNING GEAR

[75] Inventors: Raleigh F. Keeter; Francis D. Ryan, both of Schenectady; Kenneth V. Wellner, Ballston Spa, all of N.Y.; Gerhard A. Nickstadt, Oakland, N.J.

[73] Assignee: General Electric Company, Schenectady, N.Y.

[22] Filed: Sept. 30, 1974

[21] Appl. No.: 510,217

[52] U.S. Cl. .................... 74/384; 60/39.14; 74/405
[51] Int. Cl.² . F16H 35/00; F16H 57/00; F02G 3/00
[58] Field of Search ............... 74/384, 405; 290/2; 60/39.14, 709

[56] References Cited
UNITED STATES PATENTS

| | | |
|---|---|---|
| 2,949,730 | 8/1960 | Kenney et al. ................... 60/709 |
| 2,962,597 | 11/1960 | Evans .............................. 290/2 |
| 3,485,041 | 12/1969 | Evans .......................... 60/39.14 |
| 3,762,272 | 10/1973 | Escobedo ........................ 74/384 |

Primary Examiner—Leonard H. Gerin
Attorney, Agent, or Firm—John F. Ahern; James W. Mitchell

[57] ABSTRACT

A turning gear for a turbomachine rotor wherein a clash pinion is pre-engaged with a rotor bull gear prior to rolling the turbine rotor. The turning gear includes a small, continuous stall motor mounted in tandem with a larger main turning gear motor, both motors having a common output shaft connected to the gear train of the turning gear. The small motor climbs the clash pinion into engagement with the rotor bull gear in order to eliminate gear train backlash prior to rolling the turbine rotor with the larger motor.

7 Claims, 3 Drawing Figures

U.S. Patent  Nov. 18, 1975  3,919,894
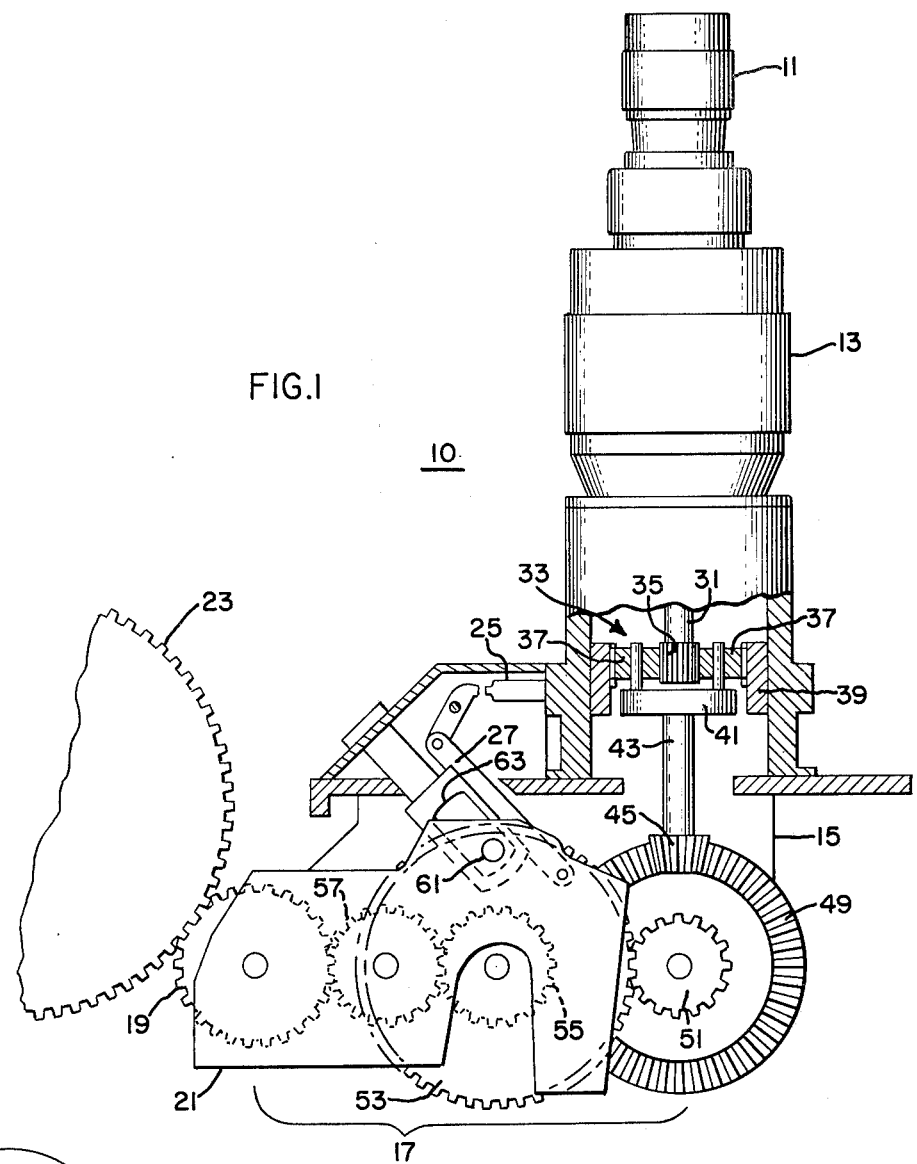
FIG.1
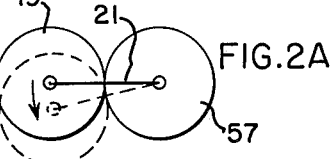
FIG.2A
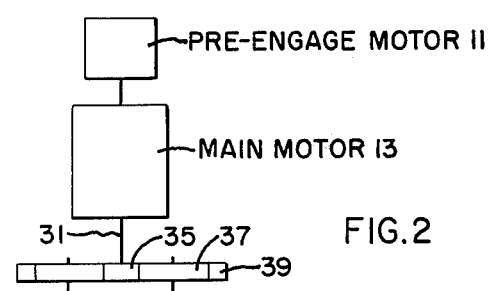
FIG.2
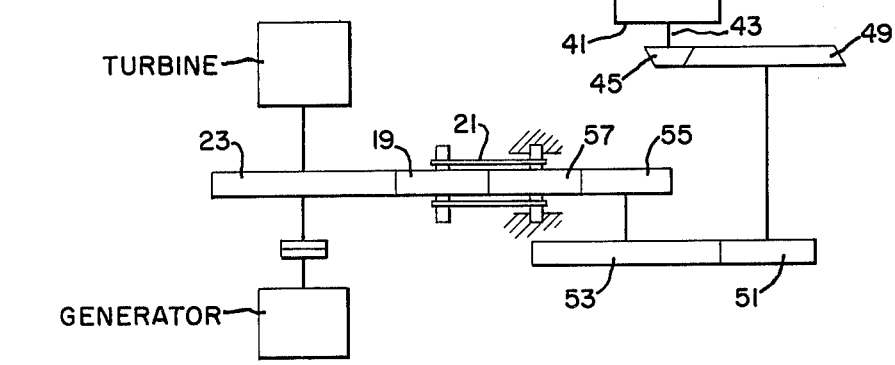

PRE-ENGAGEMENT TURNING GEAR

Background of the Invention

This invention relates generally to large turbomachines; and, in particular, this invention relates to turning gears for steam turbine-generator units.

A turning gear is a motor-driven gear train, the primary function of which is to slowly roll a turbomachine rotor prior to starting the units with steam and after shutdown to ensure that the rotor remains straight. There is a tendency for a turbine rotor to sag between relatively long bearing spans if left motionless. A turbine rotor will cool unevenly if permitted to remain stationary for a period of time. This may cause the rotor to bow which would result in severe vibration and rubbing of stationary parts when rolling at only a few hundred RPM. A secondary function of the turning gear is jogging a rotor to a new position during assembly, balance operations, and inspections.

A turning gear is actuated as a rotor coasts to a stop after a period of operation. A short time prior to a zero-speed indication from the turbine, the tuning gear motor is energized. When the zero-speed indication is received, a turning gear pressurized fluid cylinder rotates a clash pinion carrier (carriage) to a position adjacent a bull gear on the turbine rotor. The clash pinion itself, rotated by the turning gear motor, through a gear train, is forced into mesh with the rotor bull gear.

The turning gear motor must have sufficient power to generate enough torque to roll the turbine rotor and also have a sufficiently low moment of inertia to avoid excessive gear clash forces. It has been found that it is not easy to effect such a compromise and that alternative solutions include increasing gear size or eliminating the so-called clash engagement altogether.

It is one object of the present invention to provide a turning gear device having increased torque generating capability while tooth engagement forces are minimized.

It is another object of the present invention to eliminate significant clash engagement forces between the turning gear clash pinion and the rotor bull gear.

Still another object of the present invention is to provide a high capacity output turning gear with minimal hardware modification for retrofit purposes.

The foregoing and further objects of the invention are carried out by providing for pre-engagement of the turning gear clash or output pinion with the rotor bull gear prior to starting the main turning gear motor. Since the respective gear teeth cannot be assumed to be in phase, it is necessary to slowly rotate the clash pinion as it climbs into mesh with the bull gear. To accomplish this, a relatively small torque continuous stall torque motor is mounted in tandem with the main turning gear motor, both having a common output shaft. Immediately prior to the rotor coasting to zero speed the small torque motor is energized. As the turning gear has received a zero-speed indication from the turbine, a pressurized fluid cylinder is actuated and the clash pinion is brought into contact with the bull gear. The slow rotation of the clash pinion will ensure meshing of the gear teeth and will eliminate any backlash in the entire gear train as the clash pinion climbs on the bull gear. After a short time delay the main motor is started to roll the turbine rotor. The foregoing described invention reduces peak dynamic contact stresses by a factor of four to six in applications similar to those of large turbomachines.

The novel features believed characteristic of the present invention are set forth in the appended claims. The invention itself, however, together with further objects and advantages thereof, may best be understood with reference to the following description, taken in connection with the appended drawing.

BRIEF DESCRIPTION OF THE DRAWINGS

FIG. 1 is a partial cross section of the turning gear and rotor bull gear according to the present invention.

FIG. 2 is a line diagram schematic showing the turning gear according to the present invention.

FIG. 2A is a schematic diagram of the bull gear and clash pinion.

DETAILED DESCRIPTION OF THE INVENTION

The turning gear 10 includes a small torque pre-engagement motor 11 which may be mounted in tandem or series with a larger main drive motor 13 on a frame 15 and driving a gear train 17. The gear train terminates in a clash pinion 19 mounted on a movable carriage 21. The clash pinion selectively engages a bull gear 23 which is mounted on the turbine rotor. A fluid pressurized cylinder 25, fixed at one end to the frame, actuates a linkage 27 attached to the movable carriage for moving the carriage so that the clash pinion may engage the rotor bull gear.

The small torque motor or pre-engagement motor 11 is mounted in tandem or series with the larger main turning gear drive motor 13 so that the two have a common output shaft 31. The output shaft 31 drives a planetary system 33 comprising a sun gear 35, planet gears 37 mounted in a stationary ring or cage 39. The planet gears drive a spline 41.

The spline 41 turns a drive shaft 43 having a bevel gear 45 at its output end. The bevel gear 45 drives a reduction gear 49 which is coaxial with a pinion 51. Pinion 51 meshes with and drives a second reduction gear 53. The second reduction gear is coaxial with pinion 55 which meshes with and rotates pinion 57.

Pinion 57 meshes with and rotates clash pinion 19 which is mounted on the movable carriage 21. Pinion 57 has an axis of rotation which is coincident with the axis of rotation of the movable carriage thereby allowing the carriage to move in and out of engagement with the bull gear vis-a-vis the clash pinion 19 while the clash pinion 19 and the pinion 57 remain continuously in mesh. This construction is clearly shown in FIG. 2A wherein the phantom lines indicate the disengaged position of the clash pinion and carriage.

The movable carriage is positioned into engagement with the bull gear by means of the pressurized fluid cylinder 25 and associated linkage 27, the latter being attached to the movable carriage. The carriage also includes a stop means 61 which may be a pin or the like, which rides in a yoke 63 which is fixed to the turning gear frame. The pressurized fluid cylinder may be actuated by a switch (not shown), for example, a solenoid air valve which is actuated by an electrical signal. Once engaged, the clash pinion and bull gear will not disengage except when the turbine rotor is running faster than it can be driven by the turning gear, e.g., when powered by a motive fluid. The engaged turning gear (when driving the turbine rotor) creates a tooth force loading on its pinion lever arm which is in a direction to hold the clash pinion to the engaged position. If the engaged turning gear is stopped, the turbine rotor and gear come to rest in the engaged position.

The turning gear will automatically disengage when the speed of the turbine rotor (when driven by steam) exceeds the speed of the turning gear. This reverses the tooth force between the clash pinion and bull gear so that the pinion is forced away from the bull gear and comes out of mesh. The carriage is slightly counterweighted to the disengaged position, so that when tooth contact is lost with the bull gear, the carriage will always drop away and remain out of contact with the bull gear.

The operation of the invention is as follows. When a turbine, for example a steam turbine, is being started or is coasting to zero speed, an electrical signal, which is either automatically or manually given, actuates the small pre-engagement torque motor which may be a 3 phase, 450 RPM, 10 HP continous stall motor. With the rotor substantially at rest, the pressurized fluid cylinder is actuated to move the carriage into an engagement position with the rotor bull gear. After engagement between the clash pinion and bull gear, the pre-engagement motor will stall and the main turning gear motor is actuated. The main turning gear motor may be a 2 speed, 3 phase, 750/1500 RPM, 100 HP motor. Thereafter, the turning gear will roll the turbine rotor until such time as the rotor turns under steam with sufficient speed to cause the clash pinion to fall from the bull gear as heretofore explained.

While there is shown what is considered, at present, to be the preferred embodiment of the invention, it is, of course, understood that various other modifications may be made therein. One such modification may include rotating the movable carriage by a torque wrench rather than a pressurized fluid cylinder. It is intended to claim all such modifications as fall within the true spirit and scope of the invention.

What is claimed is:

1. An improved turning gear apparatus for rolling a turbomachine rotor by selectively engaging a bull gear on the turbomachine rotor; the turning gear apparatus of the type including a stationary frame mounted adjacent the rotor bull gear; a carriage pivotally mounted to the frame including a first pinion, for engaging the rotor bull gear, rotatably mounted on the carriage and pivotal therewith; a second pinion continuously engaging the first pinion and mounted to the frame, the second pinion having an axis of rotation coaxial with the carriage axis of rotation; means for selectively positioning the carriage so that the first pinion may engage the rotor bull gear; a gear train mounted to the frame and engaging the second pinion; and, a relatively large, main turning gear motor for rolling the turbomachine rotor through the gear train and first and second pinions, wherein the improvement comprises a relatively small pre-engagement motor for climbing the first pinion into engagement with the rotor bull gear prior to rolling the turbine rotor.

2. The apparatus recited in claim 1 wherein the main turning gear motor and the pre-engagement motor are serially connected having a common output shaft driving the gear train.

3. The apparatus recited in claim 1 wherein the main turning gear motor and the pre-engagement motor are coaxial and in tandem.

4. The apparatus recited in claim 1 wherein the means for selectively positioning the carriage includes a selectively actuatable pressurized fluid cylinder.

5. The apparatus recited in claim 1 wherein the pre-engagement motor is a continuous stall motor for rotating the first pinion.

6. The apparatus recited in claim 1 wherein the main motor is a two-speed motor for rolling the turbomachine rotor.

7. The apparatus recited in claim 5 wherein the pre-engagement motor stalls after engagement with the rotor bull gear and prior to rolling the turbine rotor.

* * * * *